United States Patent
Brooks et al.

(10) Patent No.: US 9,821,737 B2
(45) Date of Patent: Nov. 21, 2017

(54) ISOLATION OF AUXILIARY ELECTRONICS BATTERY FROM STARTING BATTERY

(71) Applicant: CNH Industrial America, LLC., New Holland, PA (US)

(72) Inventors: Nathan Brooks, Manitowoc, WI (US); Steven Winkel, Kiel, WI (US)

(73) Assignee: CNH Industrial Americal LLC, New Holland, PA (US)

( * ) Notice: Subject to any disclaimer, the term of this patent is extended or adjusted under 35 U.S.C. 154(b) by 285 days.

(21) Appl. No.: 14/700,230

(22) Filed: Apr. 30, 2015

(65) Prior Publication Data
US 2016/0318466 A1    Nov. 3, 2016

(51) Int. Cl.
| | | |
|---|---|---|
| *B60R 16/033* | (2006.01) | |
| *F02N 11/08* | (2006.01) | |
| *H02J 1/08* | (2006.01) | |
| *H02J 7/14* | (2006.01) | |

(52) U.S. Cl.
CPC ............ *B60R 16/033* (2013.01); *F02N 11/08* (2013.01); *H02J 1/08* (2013.01); *H02J 7/1423* (2013.01)

(58) Field of Classification Search
CPC .................................................. B60R 16/033
See application file for complete search history.

(56) References Cited

U.S. PATENT DOCUMENTS

| | | |
|---|---|---|
| 4,564,797 A | 1/1986 | Binkley |
| 4,883,728 A | 11/1989 | Witehira |
| 5,264,777 A | 11/1993 | Smead |
| 5,418,444 A | 5/1995 | Cook et al. |
| 6,057,666 A * | 5/2000 | Dougherty ............ H02J 7/0054 320/104 |
| 6,271,642 B1 | 8/2001 | Dougherty et al. |
| 6,275,001 B1 | 8/2001 | Dierker |
| 6,426,606 B1 | 7/2002 | Purkey |
| 6,452,361 B2 | 9/2002 | Dougherty et al. |
| 6,531,848 B1 | 3/2003 | Chitsazan et al. |
| 6,650,091 B1 | 11/2003 | Shiue et al. |
| 6,815,929 B1 | 11/2004 | Dagan et al. |
| 6,912,142 B2 | 6/2005 | Keim et al. |
| 8,004,242 B1 | 8/2011 | Purkey et al. |
| 8,078,339 B2 | 12/2011 | Oakes |
| 8,159,078 B2 | 4/2012 | Usselman et al. |
| 8,179,103 B2 | 5/2012 | Doljack |

(Continued)

OTHER PUBLICATIONS

Vehicle Battery; Vehicle Dual Battery System; Web-Site—letsgetaway.com; May 9, 2008: Retrieved from http://www.lets-get-away.com/dual-battery.htm.

(Continued)

*Primary Examiner* — Jeffrey Zweizig
(74) *Attorney, Agent, or Firm* — Rebecca L. Henkel; Rickard K. DeMille

(57) ABSTRACT

A battery combiner may be used to electrically isolate first and second batteries during conditions in which a first battery required for a mechanical drive system may experience excessive power draw. The second battery may be used to provide a switched and/or continuous power source to a control system and/or other electrical devices for reliable operation, and the combiner may join the first and second batteries together such that both are electrically charged by a single alternator during conditions when it is safe.

20 Claims, 5 Drawing Sheets

(56) References Cited

U.S. PATENT DOCUMENTS

| | | | |
|---|---|---|---|
| 8,344,541 B1 * | 1/2013 | Li | B60R 16/0232 |
| | | | 307/10.1 |
| 8,390,145 B2 | 3/2013 | Harding | |
| 8,749,193 B1 * | 6/2014 | Sullivan | H02J 1/08 |
| | | | 307/10.7 |
| 8,920,965 B2 | 12/2014 | Kim et al. | |
| 8,940,428 B2 | 1/2015 | Woo | |
| 9,243,601 B2 * | 1/2016 | Reichow | F02N 11/0866 |

OTHER PUBLICATIONS

Smart Battery Isolator; Inexpensive 12 volt Smart Battery Isolator with150+ amps pass-through and solid-state control; Power Stream; Retrieved from: http://www.powerstream.com/battery-isolator.htm; Apr. 6, 2015.

HD Series Bi-Stable Battery Combiners; New Product Sales Sheet; Littelfuse Commercial Vehicle Products: D-652 Rev A; www.littelfuse.com/cvp.

* cited by examiner

ISOLATION OF AUXILIARY ELECTRONICS BATTERY FROM STARTING BATTERY

FIELD OF THE INVENTION

The invention relates generally to agricultural product application equipment such as self-propelled sprayers and, in particular, to an electrical system for an agricultural machine which includes a combiner in communication with first and second batteries via first and second ports, respectively, in which the combiner operates to connect the first and second batteries together for electrical charging when the combiner senses a voltage above a threshold.

BACKGROUND OF THE INVENTION

Agricultural machines, such as self-propelled agricultural sprayers, typically include numerous subsystems important for operation, including: a mechanical drive system, such as an engine and hydrostatic drive; a control system, such as a Virtual Terminal (VT), field computer, machine controller and/or other electronics and modules for performing field operations and other functions; and an electrical system, such as a battery, fuses and relays, for distributing power throughout the machine. As improvements in agricultural machines are made, the numerous subsystems typically become increasingly complex and consequently more demanding with respect to their power requirements.

As a result, power surges, sags, spikes and the like which may be caused by the mechanical drive system may increasingly affect the control system and other electrical devices which rely on a steady power source for reliable operation. For example, when the engine is initially started (i.e., cold cranking), excessive power may be drawn from the battery thereby causing voltage to the control system and other electrical devices to drop substantially. As a result, the control system and other electrical devices may experience unacceptable power losses and potentially damage. What is needed is an improved electrical system for meeting the increasing power demands of the mechanical drive system, the control system and other electrical devices of agricultural machines without the aforementioned drawbacks.

SUMMARY OF THE INVENTION

A battery combiner may be used to electrically isolate first and second batteries during conditions in which a first battery required for a mechanical drive system may experience excessive power draw. The second battery may be used to provide a switched and/or continuous power source to a control system and/or other electrical devices for reliable operation, and the combiner may join the first and second batteries together such that both are electrically charged by a single alternator during conditions when it is safe. The combiner may sense voltage levels on one or more ports connected to the first and second batteries, and compare the voltage levels to one or more thresholds for determining whether to connect/combine the batteries or disconnect/isolate the batteries. The battery combiner may be, for example, a two-position rocker switch.

Accordingly, for example, power drawn from the engine side battery, such as during cold cranking, does not affect the onboard electronics which draws power from a separate electronics side battery. After cranking, the battery combiner joins the batteries for charging by the alternator.

A manual switch may be provided in the cabin to override the battery combiner. Consequently, if the engine side battery fails, the manual switch may be selected so that the electronics side battery is accessible by the engine for cranking. Accordingly, having a dead battery preventing an engine start may be avoided.

The battery combiner may be configured to close when (1) manually selected to close, or (2) when voltages on either side are above a first threshold, such as 13.4V DC. The battery combiner may also be configured to open when (1) manually selected to open, or (2) when voltages on either side are below a second threshold, such as 12.4V DC.

The electronics side battery may utilize a relay switch to provide a switched electrical power source to a power distribution circuit by going through the switch and a continuous electrical power source to the power distribution circuit by bypassing the switch. Accordingly, electrical loads may be connected to either the switched electrical power source or the continuous electrical power source to lessen the continuous electrical load on the electronics side battery.

According to one aspect of the invention, an electrical system for an agricultural machine may include: a starter motor for starting the agricultural machine; an alternator for producing an electrical charge; a first battery in communication with the starter motor and the alternator; a second battery; a power distribution circuit for providing power to electrical loads of the agricultural machine; a switch; and a combiner in communication with the first and second batteries via first and second ports, respectively. The second battery may be configured to provide a switched electrical power source to the power distribution circuit by going through the switch and a continuous electrical power source to the power distribution circuit by bypassing the switch. Also, the combiner may operate to connect the first and second batteries together for electrical charging by the alternator when the combiner senses a voltage at the first port above a threshold.

According to another aspect of the invention, an agricultural sprayer may include: a sprayer boom extending transversely relative to the agricultural sprayer; a starter motor for starting the agricultural machine; an alternator for producing an electrical charge; a first battery in communication with the starter motor and the alternator; a second battery; a power distribution circuit for providing power to electrical loads of the agricultural machine; a switch; and a combiner in communication with the first and second batteries via first and second ports, respectively. The second battery may be configured to provide a switched electrical power source to the power distribution circuit by going through the switch and a continuous electrical power source to the power distribution circuit by bypassing the switch. Also, the combiner may operate to connect the first and second batteries together for electrical charging by the alternator when the combiner senses a voltage at the first port above a threshold.

The combiner may further include an override switch for connecting the first and second batteries together via the first and second ports, and a Light Emitting Diode (LED) may be configured to illuminate when the override switch connects the first and second batteries. The combiner may also operate to disconnect the first and second batteries for electrically isolating the second battery from the starter motor when the combiner fails to sense a voltage on the first port above a second threshold.

The electrical system may include at least first and second electrical loads in communication with the power distribution circuit. The first electrical load may receive power from the switched electrical power source, and the second electrical load may receive power from the continuous electrical power source. The first electrical load could be, for example, a lighting system for the agricultural machine, and the second electrical load could be, for example, a field computer (or VT), such as an Advanced Farming Systems Pro 700 as available from CNH Industrial.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
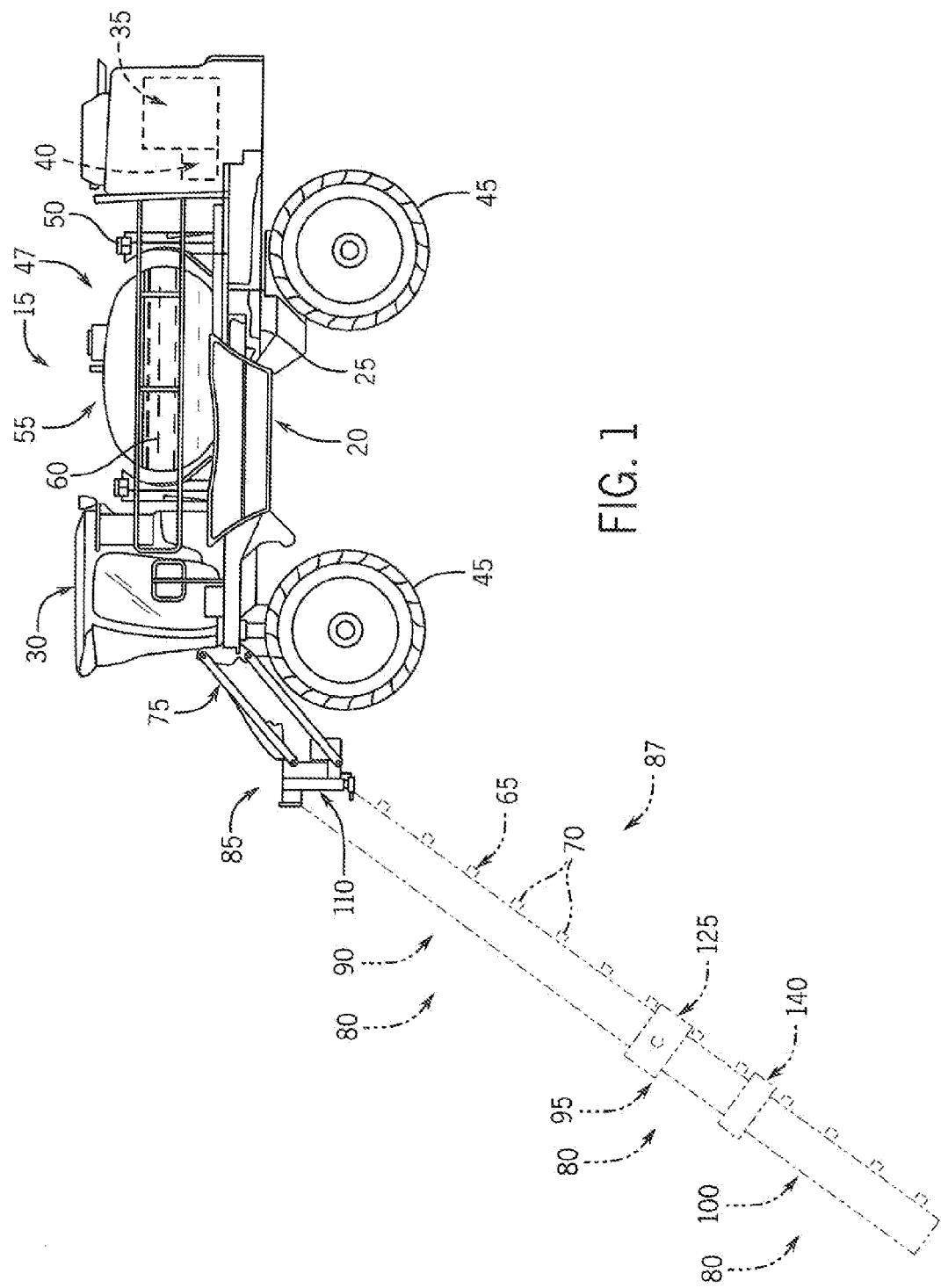
FIG. 1 is a side elevation of an exemplar agricultural machine according to the present invention.

Referring now to the drawings and specifically to FIG. 1, an electrical system for which includes a combiner in communication with first and second batteries via first and second ports, respectively, explained in greater detail elsewhere herein, is shown for use with an agricultural machine which may be an agricultural sprayer. The agricultural sprayer is shown here as a self-propelled agricultural sprayer vehicle or self-propelled sprayer 15. Although sprayer 15 is shown as a front-mounted boom self-propelled sprayer, it is understood that self-propelled versions of sprayer 15 can have either front-mounted or rear-mounted booms, such as those available from CNH Industrial, including the Miller Nitro and Condor Series sprayers and New Holland Guardian Series sprayers.

Still referring to FIG. 1, sprayer 15 includes chassis 20 having chassis frame 25 that supports various assemblies, systems, and components. These various assemblies, systems, and components include a cab 30, an engine 35 and hydraulic system 40. The hydraulic system 40 receives power from the engine 35 and includes at least one hydraulic pump which may be in a hydrostat arrangement for providing hydraulic pressure for operating hydraulic components within the hydraulic system 40. For sprayers with hydrostatic drives, hydraulic motors are operably connected to the hydraulic pump(s) for rotating the wheels 45. In mechanical drive applications, a mechanical transmission receives power from the engine 35 and delivers power for rotating the wheels 45 by way of power-transmitting driveline components such as drive shafts, differentials, and other gear sets in portal, drop boxes, or other housings. A spray system 47 includes storage containers such as rinse tank 50 storing water or a rinsing solution and a product tank 55 that stores a volume of product 60 for delivery onto an agricultural field with sprayer 15. A product delivery pump conveys product 60 from product tank 55 through plumbing components such as interconnected pieces of tubing and through a boom tubing system 65 for release out of spray nozzles 70 that are spaced from each another along the width of boom 7 during spraying operations of sprayer 15. Groups or banks of multiple adjacent spray nozzles 70 define multiple spray sections 72 of spray system 47. Spray sections 72 are defined along boom 7 and selectively deliver product 60 for release onto an agricultural field at locations corresponding to positions of activated spray sections 72. Boom 7 is connected to chassis 20 with lift arm assembly 75 that is configured to move the boom 7 up and down for adjusting the height of application of the product 60.

Figure 2:
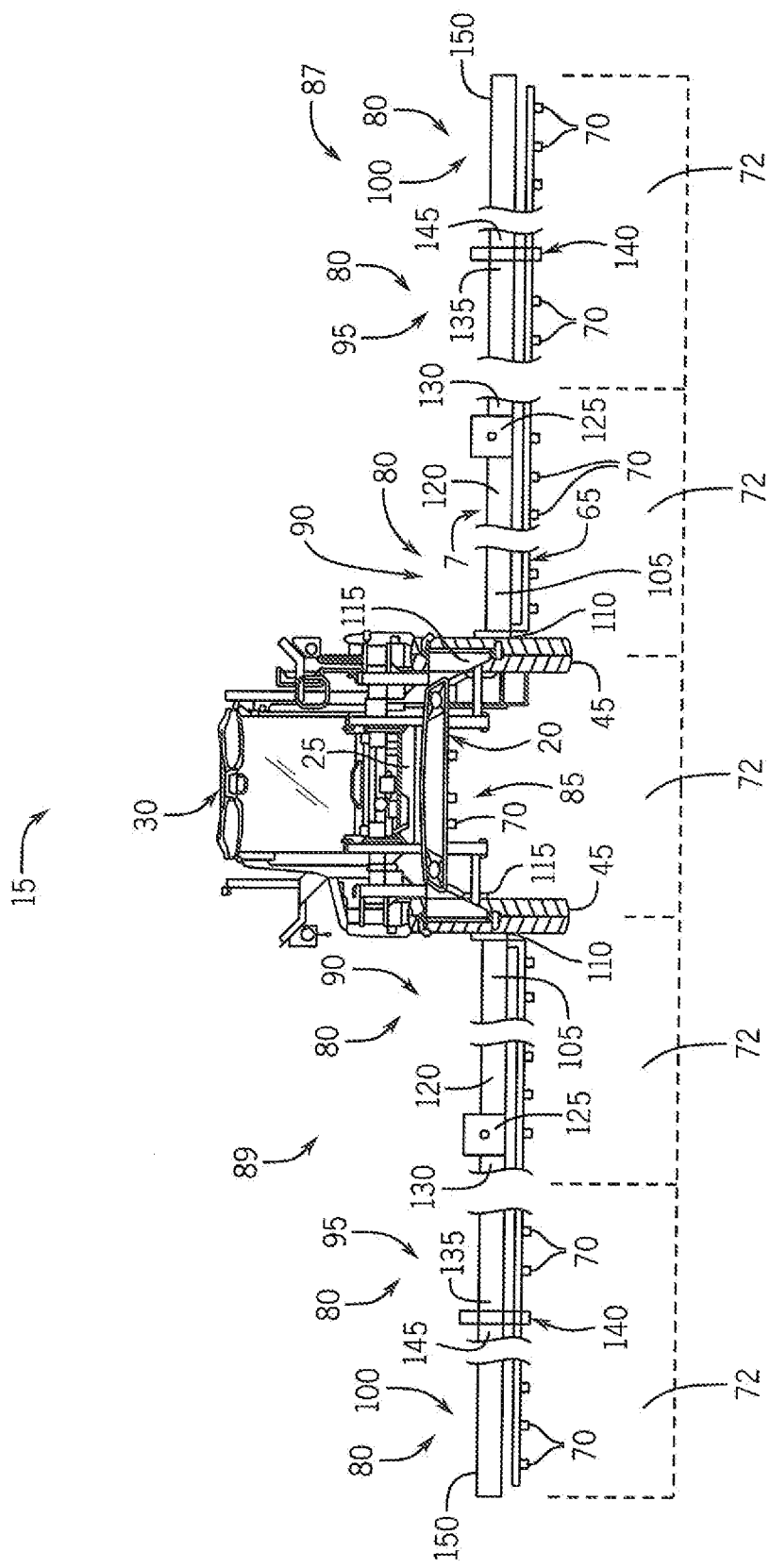
FIG. 2 is a front elevation of the agricultural machine of FIG. 1.

Referring now to FIG. 2, boom 7 includes multiple boom segments 80 connected longitudinally to provide the corresponding width of the assembled boom 7. Boom segments 80 include center section 85 and left and right boom arms 87, 89 extending in opposite directions from center section 85. Left and right boom arms 87, 89 have multiple segments with pairs of primary boom segments 90, secondary boom segments 95, and breakaway boom segments 100 extending in opposite directions along the respective left and right boom arms 87, 89, mirrored about a longitudinal axis of the sprayer 15. The corresponding left and right segments of the pairs of primary, secondary, and breakaway boom segments 90, 95, 100 are substantially identical, so only one will be described, with the description applying to both the left and right segments of left and right boom arms 87, 89. Primary boom segment 90 has a primary boom inner end 105 that is connected with hinge 110 to center section outer end 115, with hinge 110 configured to allow for generally rearward horizontal pivoting of the boom primary, secondary, and breakaway segments 90, 95, 100 toward the chassis 20 when folding boom 7 to achieve a stored position. Primary boom segment 90 extends from primary boom inner end 105 away from center section 85 to primary boom outer end 120. Hinge 125 is arranged between primary boom outer end 120 and secondary boom inner end 130 and is configured to allow for folding the secondary and breakaway segments 95, 100 relative to primary boom segment 90 to achieve the stored position. For horizontal folding of secondary and breakaway segments 95, 100 against the primary boom segment 90, the hinge 125 allows horizontal pivoting of the secondary and breakaway segments 95, 100 toward primary boom segment 90. For vertical folding of secondary and breakaway segments 95, 100 against the primary boom segment 90, the hinge 125 allows vertical pivoting of the secondary and breakaway segments 95, 100 toward to primary boom segment 90. Secondary boom segment 95 extends from secondary boom inner end 130 away from primary boom segment 90 to secondary boom outer end 135. Breakaway joint 140 is arranged between secondary boom outer end 135 and breakaway boom inner end 145 and is configured to allow for momentary deflecting of the breakaway boom segment 100 away from its outwardly extended position during collisions with the crops, the ground, and/or other obstacles. Breakaway boom segment 100 extends from breakaway boom inner end 145 away from secondary boom segment 95 to breakaway boom outer end 150. In the stored position of boom 7, the secondary and breakaway boom segments 95, 100 are folded against the primary boom segment 90. The primary boom segment 90 is folded toward chassis 20 so that the breakaway boom outer end 150 is near the primary boom inner end 105 tucked toward the front of sprayer 15 with the primary boom outer end 120 and secondary boom inner end 130 tucked toward the back of sprayer 15

Figure 3:
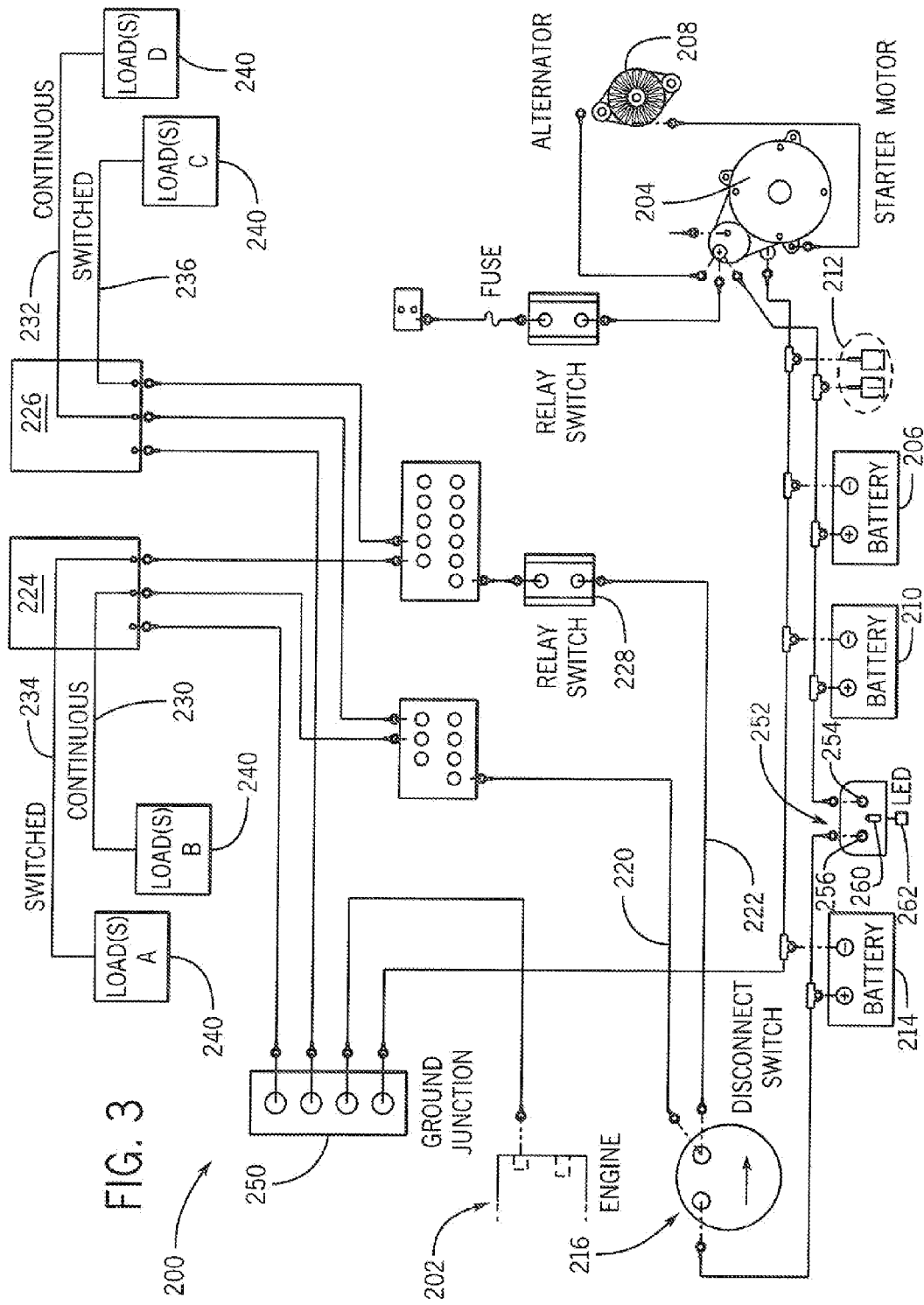
FIG. 3 is a simplified schematic of an electrical system for the machine of FIGS. 1 and 2 according to the present invention.

Referring now to FIG. 3, a simplified schematic of an electrical system 200 for the machine of FIGS. 1 and 2 is provided according to the present invention. An engine 202 in communication with a starter motor 204 may constitute elements of a mechanical drive system which require electrical power in the electrical system 200. The starter motor 204 is used to start the engine 202, and accordingly the sprayer 15, via an operator in the cab 30. Accordingly, the starter motor 204 draws electrical current from a first battery 206 (primary or engine side battery) that is in communication with the starter motor 204. This initial starting condition may be referred to as "cold cranking," which typically causes excessive power (voltage and current) to be drawn from the first battery 206. Once the engine 202 is running, an alternator 208 may be driven to produce electrical charge for maintaining charge with respect to the first battery 206.

The first battery 206 may have a nominal voltage, for example, of 12 Volts DC and may be capable of producing, for example, 1000 cold crank Amperes. A backup battery 210 may optionally be connected in series with the first battery 206, for example, and may be identical to the first battery 206 for providing an additional 12 Volts DC nominal voltage and 1000 cold crank Amperes (thereby totaling 2000 cold crank Amperes) for more robust support of the engine 202 in addition, battery jump starting posts 212 may also be provided for jump starting the first battery 206 and/or the backup battery 210 in case of a battery failure.

A second battery 214 (secondary or electronics side battery) may also be provided in the electrical system 200 for providing power to the control system and other electrical devices of the sprayer 15. The second battery and may also be identical to the first battery 206, providing 12 Volts DC nominal voltage. The second battery 214 may be connected to a manually operated disconnect switch 216 for electrically isolating the second battery 214 from the rest of the control system and other electrical devices. Turning the disconnect switch 216 off (e.g., straight up) may disconnect the batteries from the vehicles electrical system. Turning the disconnect switch 216 on (e.g., horizontal) may enable the entire electrical system. Accordingly, the electrical system may be disconnected when the sprayer 15 is left for extended periods of time or if there is a drain on the batteries. The disconnect switch 216 can also be locked (with a pad lock) when the sprayer 15 is left unattended.

When the disconnect switch 216 is on, the second battery 214 may provide electrical power via a first leg 220 and a second leg 222. The first leg 220 may be used to provide a continuous electrical power source, while the second leg 222 may be used to provide a switched electrical power source. Accordingly, the first leg 220 may connect to first and second distribution circuits 224 and 226, respectively, perhaps via one or more fuse, relay and/or distribution block components. However, the second leg 222 may connect to the first and second distribution circuits 224 and 226, respectively, by going through a switch 228 disposed in the path. The switch 228 may be, for example, an electrically operated relay switch which may be controlled by an operator in the cab 30. As a result, the first leg 220 may produce, via the first and second distribution circuits 224 and 226, first and second continuous electrical power sources 230 and 232, respectively. Similarly, the second leg 222 may produce, via the switch 228 and the first and second distribution circuits 224 and 226, respectively, first and second switched electrical power sources 234 and 236, respectively.

A plurality of electrical loads 240 may be variously connected to the first and second continuous electrical power sources 230 and 232, respectively, and the first and second switched electrical power sources 234 and 236, respectively. The electrical loads 240 may be distributed, for example, according to priority, function, fusing requirements, and the like (and may utilize ground connections which may lead to a common ground junction 250). For example, an important electrical device more easily susceptible to occasional disruption of power, such as a field computer (or VT), may be connected as a sole device to the first continuous electrical power source 230 ("Load A"). However, an electrical device less susceptible to occasional disruption of power, such as a lighting system or spray monitor for the sprayer 15, may be connected as one of several devices to the first switched electrical power source 234 ("Loads B"). Accordingly, electrical loads may be connected to either a switched electrical power source or a continuous electrical power source (via, the first and second distribution circuits 224 and 226, respectively) to lessen continuous electrical load on the second battery 214.

Also in the electrical system 200, a battery combiner 252 is in communication with the first and second batteries 206 and 214, respectively, via first and second ports 254 and 256, respectively. The combiner 252 operates to connect the first and second batteries 206 and 214, respectively, together for electrical charging by the alternator 208 when the combiner 252 senses a voltage at the first port 254 above a threshold. The combiner 252 could be, for example, an HD Series Bi-Stable Battery Combiner with an intelligent relay for sharing charge voltage between two battery banks, as available from Littelfuse, Inc. of Chicago, Ill.

Accordingly, the combiner 252 may function to protect sensitive electronic equipment during cranking by separating battery banks (the first battery 206 and the backup battery 210, from the second battery 214). Once cranking of the engine is complete, the combiner 252 may sense a charging level voltage at the first port 254 that is a threshold, such as 13.1 Volts DC. The combiner 252 may then operate to combine the battery banks (the first battery 206 and the backup battery 210 with the second battery 214). This allows the sprayer 15 to then have all such batteries at its disposal during operation.

When the sprayer 15 is shut off (i.e., the engine is turned off), the combiner 252 may once again separate the battery banks (the first battery 206 and the backup battery 210, from the second battery 214), for example, upon sensing a voltage level at the first port 254 that drops below a second threshold, such as 12.4 Volts DC. As such, the combiner 252 may operates to disconnect the first and second batteries 206 and 214, respectively, for electrically isolating the second battery 214 from the starter motor 204 when the combiner 252 fails to sense a voltage on the first port 254 above the second threshold. With the batteries separated, normal loads on the machine are isolated to only the second battery 214. Accordingly, if the operator were to drain the second battery 214 (such as by leaving lights on, leaving spray monitors on, and so forth) the first battery 206 would see no ill effect, meaning it would stay completely charged since it is separated from the second battery 214.

The combiner 252 may also include an override switch 260 for connecting the first and second batteries 206 and 214, respectively, together via, the first and second ports 254 and 256, respectively. The override switch 260 may be used, for example, if the second battery 214 has been drained. By turning the override switch 260 "on", the combiner 252 may manually combine the battery banks (the first battery 206 and the backup battery 210 with the second battery 214) by back feeding the system and allowing the machine to start using the fully charged starting batteries. In a typical configuration, as long as the override switch 260 is in the "on" position, the battery banks are combined at all times.

When the batteries are combined via the override switch 260, a Light Emitting Diode (LED) 262 may be configured to illuminate accordingly. The LED 262 may be, for example, a red indicator light located proximal to the override switch 260.

Figure 4:
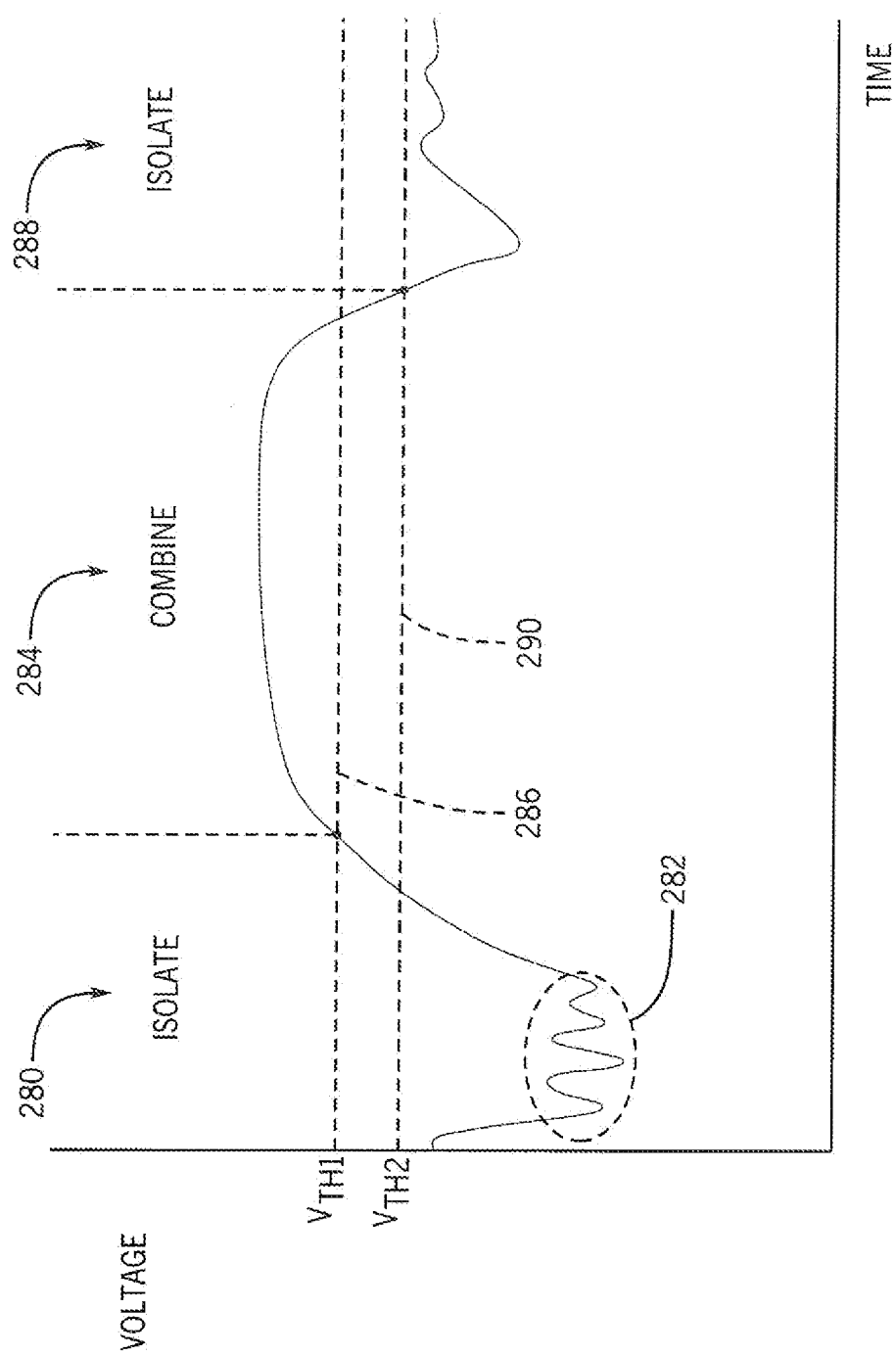
FIG. 4 is an exemplar electrical waveform of a primary (engine side) first battery as sensed by a battery combiner according to FIG. 3.

Referring now to FIG. 4, an exemplar electrical waveform of the first battery 206 as sensed by the combiner 252 is provided. In a first phase 280, the engine 202 is cold cranked via the starter motor 204, thereby resulting in excessive power drawn from the first battery 206. Accordingly, the first battery 206 falls from a nominal voltage, such as 12 Volts DC, to a substantially lower voltage, such as 7 or 8 Volts DC, due to voltage sagging, spiking and/or ringing 282 resulting from the excessive power draw. During this first phase, the first and second batteries 206 and 214, respectively, are =combined, with the second battery 214 being electrically isolated. After the engine 202 is started, the alternator 208 is then driven to begin electrically charging the first battery 206.

Next, in a second phase 284, the alternator 208 electrically charges the first battery 206 above a threshold 286, such as 13.1 Volts DC. Upon sensing a voltage at the first port 254 above the threshold 286, the combiner 252 may operate to connect the first and second batteries 206 and 214, respectively, together for electrical charging by the alternator 208. Subsequently, upon turning off the engine 202, the alternator 208 ceases to electrically charge the first and second batteries 206 and 214, respectively, and the nominal voltage of the first and second batteries 206 and 214, respectively, begins to fall.

Then, in a third phase 288, upon failing to sense a voltage on the first port 254 above a second threshold 290, such as 12.4 Volts DC, the combiner 252 may operate to disconnect the first and second batteries 206 and 214, respectively. Accordingly, the first and second batteries 206 and 214, respectively, may once again be disconnected with the second battery 214 electrically isolated.

Figure 5:
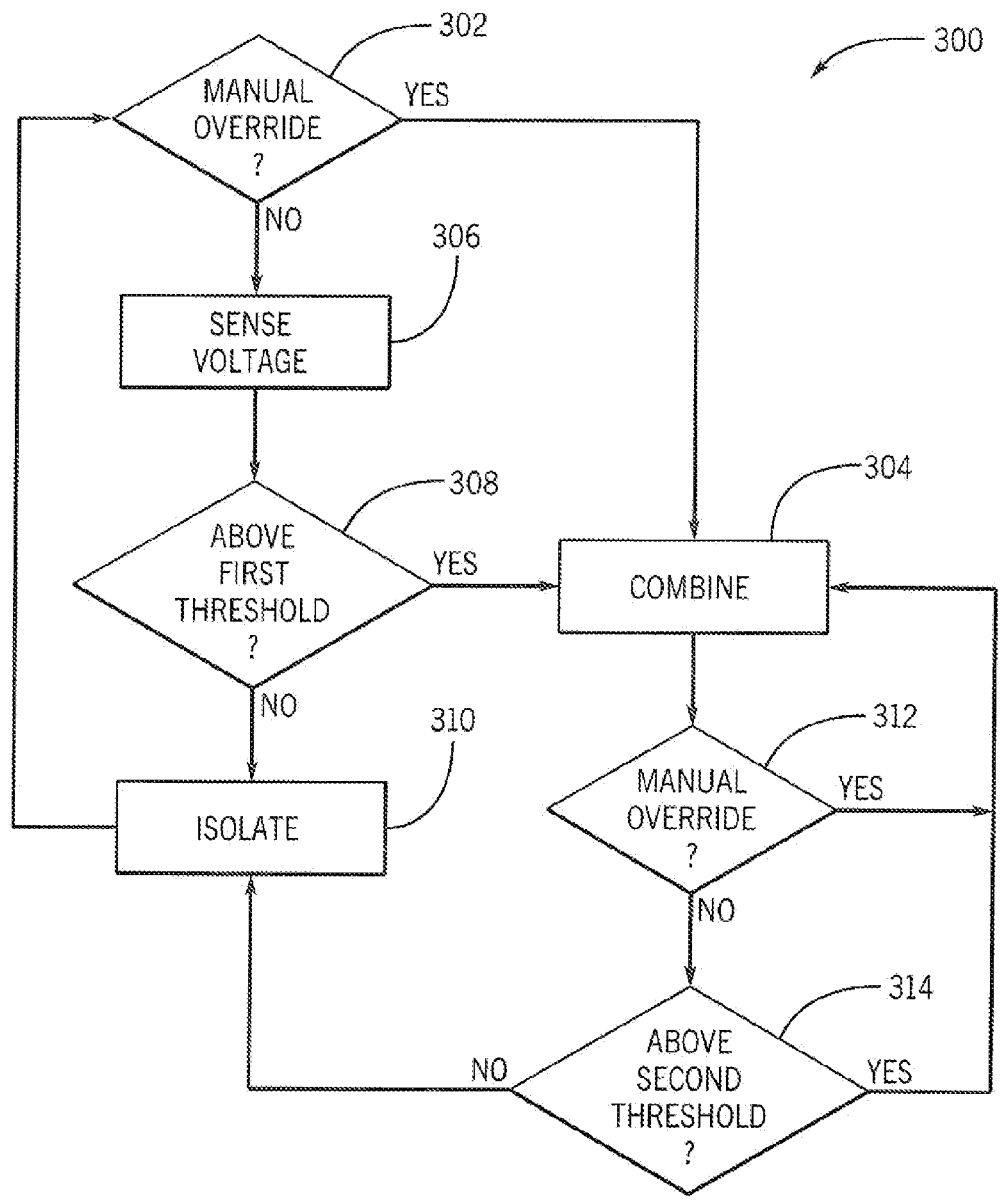
FIG. 5 is flowchart illustrating operation of the battery combiner according to FIGS. 3 and 4.

Referring now to FIG. 5, a flowchart illustrating a process 300 for operation of the battery combiner 252 is provided in decision block 302, it is first determined if the override switch 260 is turned "on." Tithe override switch 260 is in fact "on," the process 300 immediately proceeds to block 304 in which the first and second batteries 206 and 214, respectively, are combined. However, if the override switch 260 is not turned "on," the process 300 continues to block 306 in which the combiner 252 may sense a voltage level on the first port 254.

From block 306, it is then determined, in decision block 308 if the voltage level sensed on the first port 254 is above a threshold. If the voltage level is in fact above the threshold, the process 300 continues to block 304 in which the First and second batteries 206 and 214, respectively, are combined. However, if the voltage level is not above the threshold, the process 300 continues to block 310 in which the combiner 252 disconnects the first and second batteries 206 and 214, respectively, and electrically isolates the second battery 214. From block 310, the process 300 returns again to the decision block 302 with respect to determining manual override.

From block 304, in which the first and second batteries 206 and 214, respectively, are combined, the process continues to a decision block 312 in which it is also determined if the override switch 260 is turned "on." If the override switch 260 is in fact "on," the process 300 immediately returns to block 304 in which the first and second batteries 206 and 214, respectively, are combined. However, if the override switch 260 is not turned "on," the process 300 continues to decision block 314 in which it is determined if the voltage level sensed on the first port 254 is above a second threshold. If the voltage level is in fact above the second threshold, the process 300 returns to block 304 in which the first and second batteries 206 and 214, respectively, are combined. However, if the voltage level is not above the second threshold, the process 300 continues to block 310 in which the combiner 252 disconnects the first and second batteries 206 and 214, respectively, and electrically isolates the second battery 214. From block 310, the process 300 returns again to the decision block 302 with respect to determining manual override.

Many changes and modifications could be made to the invention without departing from the spirit thereof. The scope of these changes will become apparent from the appended claims.

We claim:

1. An electrical system for an agricultural machine comprising:
   a starter motor for starting the agricultural machine;
   an alternator for producing an electrical charge;
   a first battery in communication with the starter motor and the alternator;
   a second battery;
   a power distribution circuit for providing power to electrical loads of the agricultural machine;
   a switch, wherein the second battery is configured to provide a switched electrical power source to the power distribution circuit by going through the switch and a continuous electrical power source to the power distribution circuit by bypassing the switch; and
   a combiner in communication with the first and second batteries via first and second ports, respectively,
   wherein the combiner operates to connect the first and second batteries together for electrical charging by the alternator when the combiner senses a voltage at the first port above a threshold.

2. The electrical system of claim 1, wherein the combiner further comprises an override switch for connecting the first and second batteries together via the first and second ports.

3. The electrical system of claim 2, further comprising a Light Emitting Diode (LED) configured to illuminate when the override switch connects the first and second batteries.

4. The electrical system of claim 1, wherein the threshold is at least 13.1 Volts DC.

5. The electrical system of claim 1, wherein the combiner operates to disconnect the first and second batteries for electrically isolating the second battery from the starter motor when the combiner fails to sense a voltage on the first port above a second threshold.

6. The electrical system of claim 5, wherein the second threshold is at least 12.4 Volts DC.

7. The electrical system of claim 1, further comprising a backup battery connected in parallel with the first battery.

8. The electrical system of claim 1, further comprising a manually operated disconnect switch for electrically isolating the second battery from the power distribution circuit.

9. The electrical system of claim 1, further comprising first and second electrical loads in communication with the power distribution circuit, wherein the first electrical load receives power from the switched electrical power source and the second electrical load receives power from the continuous electrical power source.

10. The electrical system of claim 9, wherein the first electrical load is a lighting system for the agricultural machine and the second electrical load is a field computer.

11. An agricultural sprayer comprising:
a sprayer boom extending transversely relative to the agricultural sprayer;
a starter motor for starting the agricultural sprayer;
an alternator for producing an electrical charge;
a first battery in communication with the starter motor and the alternator;
a second battery;
a power distribution circuit for providing power to electrical loads of the agricultural sprayer;
a switch, wherein the second battery is configured to provide a switched electrical power source to the power distribution circuit by going through the switch and a continuous electrical power source to the power distribution circuit by bypassing the switch; and
a combiner in communication with the first and second batteries via first and second ports, respectively,
wherein the combiner operates to connect the first and second batteries together for electrical charging by the alternator when the combiner senses a voltage at the first port above a threshold.

12. The agricultural sprayer of claim 11, wherein the combiner further comprises an override switch for connecting the first and second batteries together via the first and second ports.

13. The agricultural sprayer of claim 12, further comprising a Light Emitting Diode (LED) configured to illuminate when the override switch connects the first and second batteries.

14. The agricultural sprayer of claim 11, wherein the threshold is at least 13.1 Volts DC.

15. The agricultural sprayer of claim 11, wherein the combiner operates to disconnect the first and second batteries for electrically isolating the second battery from the starter motor when the combiner fails to sense a voltage on the first port above a second threshold.

16. The agricultural sprayer of claim 15, wherein the second threshold is at least 12.4 Volts DC.

17. The agricultural sprayer of claim 11, further comprising a backup battery connected in parallel with the first battery.

18. The agricultural sprayer of claim 11, further comprising a manually operated disconnect switch for electrically isolating the second battery from the power distribution circuit.

19. The agricultural sprayer of claim 11, further comprising first and second electrical loads in communication with the power distribution circuit, wherein the first electrical load receives power from the switched electrical power source and the second electrical load receives power from the continuous electrical power source.

20. The agricultural sprayer of claim 19, wherein the first electrical load is a lighting system for the agricultural machine and the second electrical load is a field computer.

* * * * *